INVENTOR
Cheng P. Wen
BY Edward J. Norton
ATTORNEY

Feb. 2, 1971 CHENG PAUL WEN 3,560,893

SURFACE STRIP TRANSMISSION LINE AND MICROWAVE DEVICES USING SAME

Filed Dec. 27, 1968 3 Sheets-Sheet 2

INVENTOR
Cheng P. Wen

BY Edward J. Norton

ATTORNEY

Feb. 2, 1971 CHENG PAUL WEN 3,560,893

SURFACE STRIP TRANSMISSION LINE AND MICROWAVE DEVICES USING SAME

Filed Dec. 27, 1968 3 Sheets-Sheet 3

INVENTOR
Cheng P. Wen

BY Edward J. Norton
ATTORNEY

United States Patent Office 3,560,893

Patented Feb. 2, 1971

3,560,893

SURFACE STRIP TRANSMISSION LINE AND MICROWAVE DEVICES USING SAME

Cheng Paul Wen, Trenton, N.J., assignor to RCA Corporation, a corporation of Delaware Filed Dec. 27, 1968, Ser. No. 787,349
Int. Cl. H01p 3/08
U.S. Cl. 333—24.1 18 Claims

ABSTRACT OF THE DISCLOSURE

A desirable transmission line configuration is described wherein a narrow strip-like conductor and a wider ground conductor are arranged in an adjacent, parallel and coplanar relationship on one surface of a dielectric substrate. Also described herein are many new types of microwave devices such as isolators, phase shifters, couplers, etc. which use this type of transmission line configuration.

Figures 1, 2, 3:
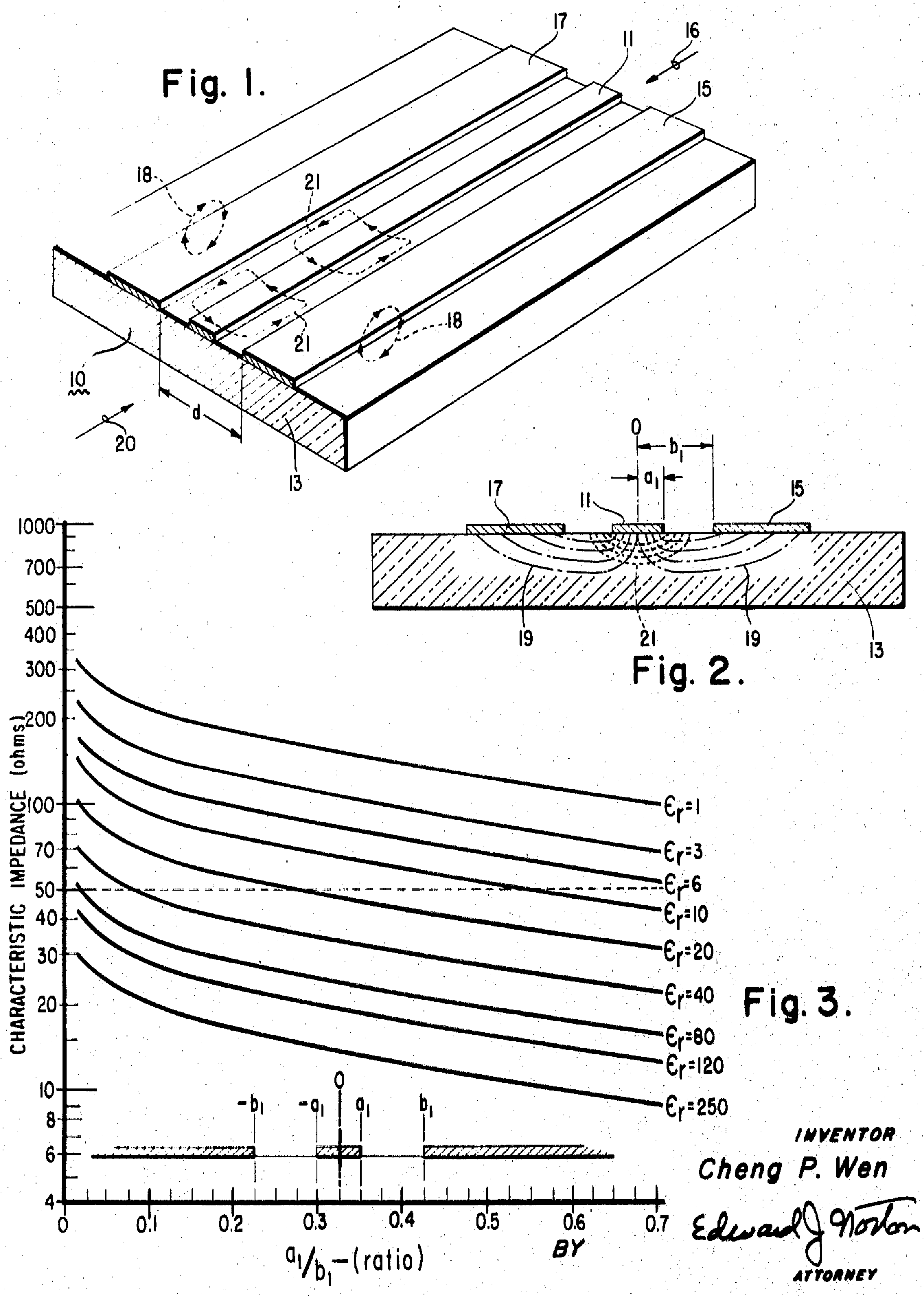

This invention relates to open nonconventional transmission lines and more particularly to a new type of strip transmission line operable at UHF frequencies and above and related devices using this type of transmission line.

In an effort to both reduce cost and minimize the space required of existing microwave systems, microwave integrated circuits are being used and minature microwave magnetic devices are required. Existing microwave integrated circuits consist of a single dielectric substrate having thereon for providing a transmission line a narrow strip-like conductor on one side of the dielectric substrate and a ground planar conductor on the opposite surface of the substrate. This arrrangement necessitates the fixing of conductive material on both sides of the substrate. The ground plane on the opposite side of the dielectric substrate is not easily accessible for shunt connections necessary for many active microwave devices. Direct dependence of the characteristic impedance on the thickness of the substrate makes it nearly impossible to employ low loss materials with high dielectric constants, a definite weakness in lower frequency application where size considerations dominate. Also, existing microwave devices utilizing the TEM (transverse electromagnetic) mode do not lend themselves to many of the nonreciprocal magnetic devices such as an isolator or differential phase shifter, for example, obtainable in waveguides. A further disadvantage of waveguides and some open nonconventional waveguides is that they have low frequency cutoff. Therefore, they are not easily adaptable for use in certain low frequency or D.C. applications, such as in combination with a diode in a detector circuit.

It is a first object of this invention to provide a new type of open nonconventional coplanar strip transmission line which does not have the above disadvantages.

It is another object of the present invention to provide a transmission line and devices that operate at a quasi-TEM mode without a low cutoff frequency.

It is a further object of the present invention top provide microwave devices wherein the transmission line used is one in which both the wider ground conductor and the narrow conductor of the transmission line is on the same surface of the dielectric substrate.

Briefly, these and other objects of the present invention are provided by a transmission line having a narrow metal strip-like conductor fixed to one broad surface of a slab of dielectric material with at least one wider ground strip-like conductor more than twice as wide as the narrow conductive strip spaced coplanar with and running parallel and adjacent to the narrow strip-like conductor on the same surface of the substrate. The dielectric constant of the substrate compared to the medium above that of the surface on which the conductors are placed is selected so that in the presence of an electromagnetic wave the electric field is confined substantially to the region of higher dielectric constant between the thin narrow strip-like conductor and the wider ground conductor and to cause a magnetic field component to be launched parallel to the direction of propagation of the applied electromagnetic wave.

DESCRIPTION OF AN EMBODIMENT OF THE INVENTION

Figure 4:
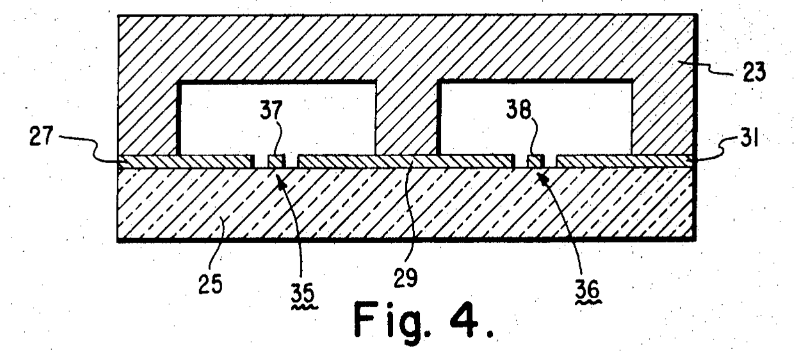
Figures 5, 6, 7:
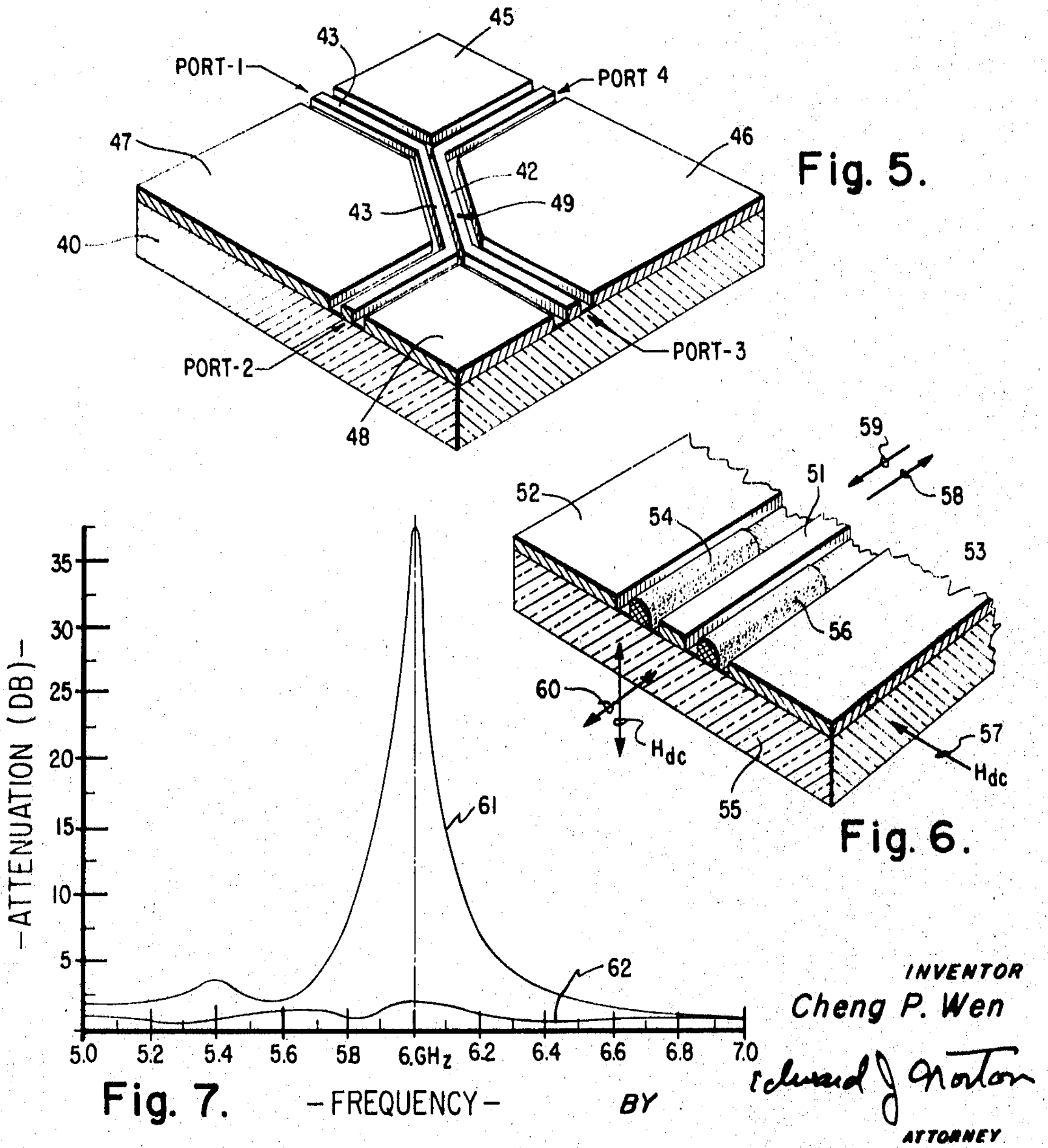

A more detailed description follows in conjunction with the following drawing wherein:

FIG. 1 is a perspective view of a coplanar strip transmission line in accordance with one embodiment of the present invention, FIG. 2 is a cross-sectional view of the transmission line shown in FIG. 1, FIG. 3 is a plot of the characteristic impedance of the type of transmission line shown in FIG. 1 as a function of the ratio $a_1$ and $b_1$ and a function of dielectric constant, FIG. 4 is a cross-sectional view of a pair of coplanar strip transmission lines of the type shown in FIG. 1 wherein a metal protective cover serves as a common ground for the transmission lines, FIG. 5 is a perspective view of a coplanar strip transmission line directional coupler in accordance with an embodiment of the present invention.

Figures 8, 9, 10:
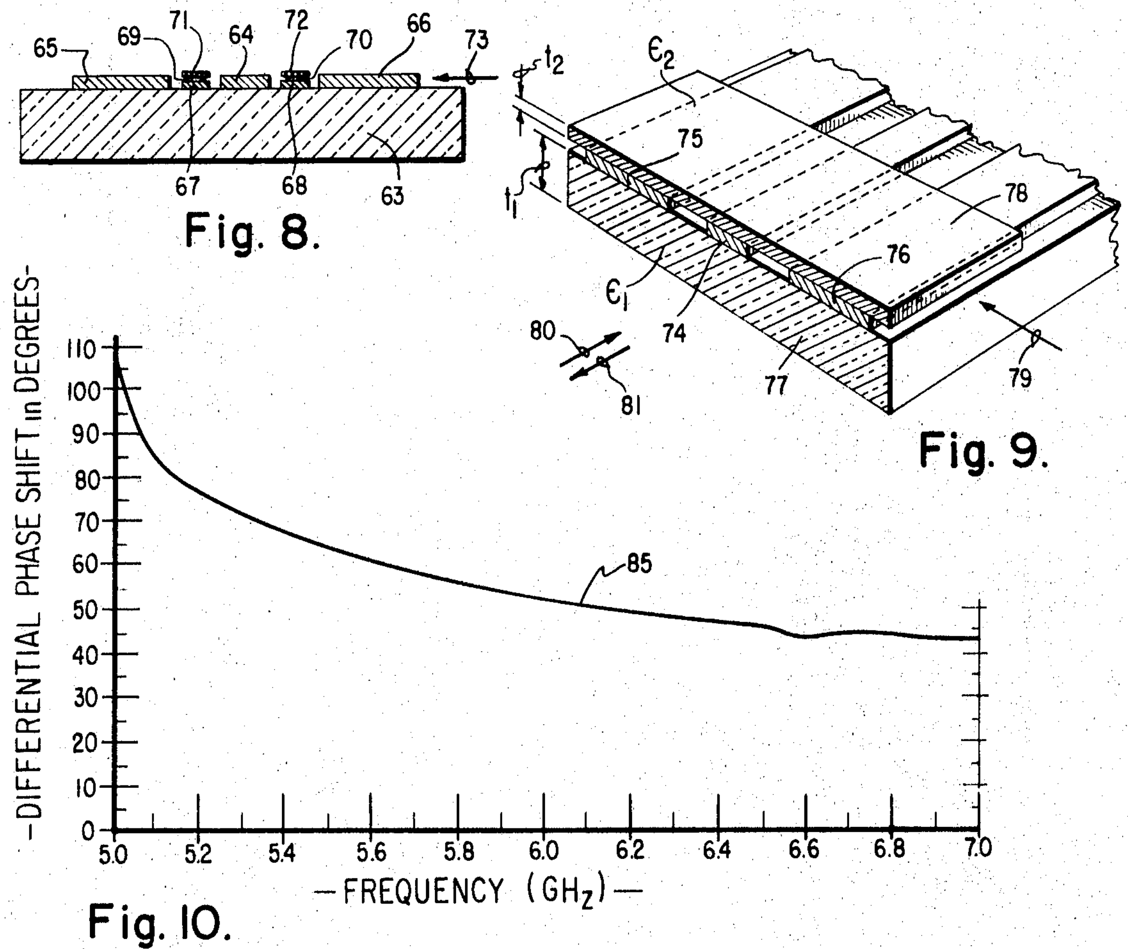
Figures 11, 12:
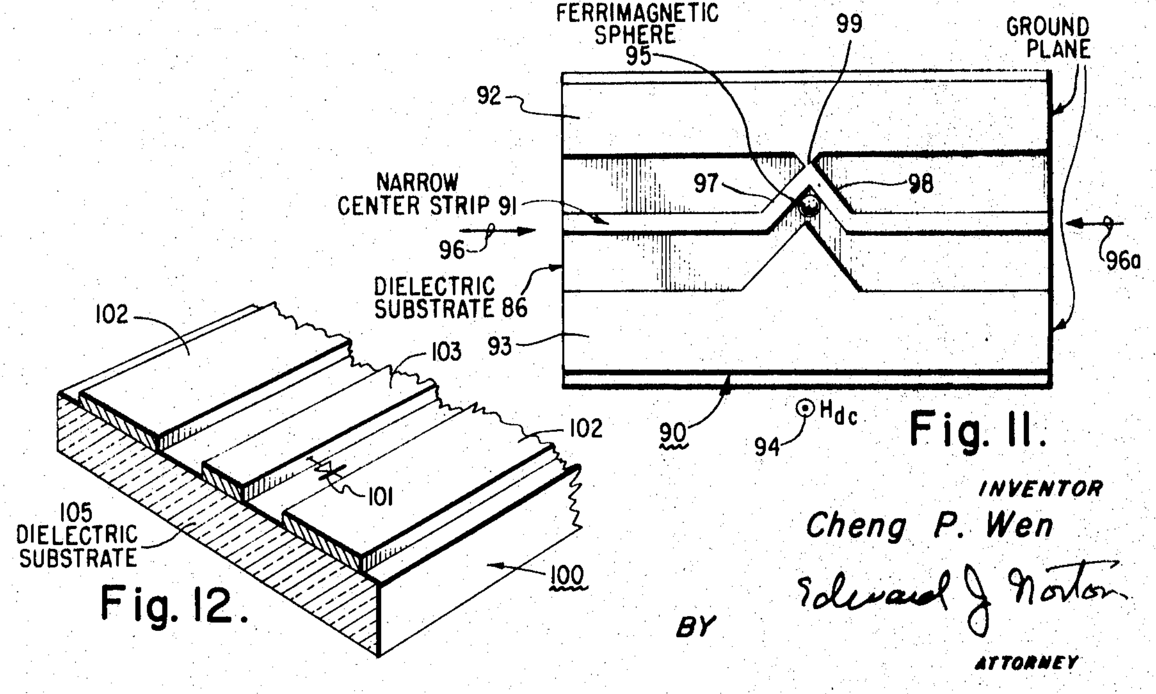

FIG. 6 is a perspective view of a coplanar strip transmission line phase shifter or isolator in accordance with an embodiment of the present invention, FIG. 7 is a plot of attenuation versus frequency for an isolator configuration like that shown in FIG. 6, FIG. 8 is a cross sectional view of a coplanar strip transmission line field displacement isolator, FIG. 9 is a partial perspective view of a strip transmission line phase shifter or isolator in accordance with another embodiment of the present invention, FIG. 10 is a plot of the phase shift of a phase shifter similar in configuration to that shown in FIG. 9 over a frequency range of 5 to 7 gHz., FIG. 11 is a top plan view of a coplanar strip transmission line resonant bandpass filter in accordance with an embodiment of the present invention, and FIG. 12 illustrates a diode used in conjunction with the above described coplanar strip transmission line.

Referring to FIG. 1 there is shown a single thin narrow strip-like metallic conductor 11 on one surface of dielectric substrate 13. A first wider ground conductor 15 at least more than twice as wide as the narrow strip-like conductor 11 spaced near to and parallel and coplanar with the narrow strip-like conductor 11. A second wider planar ground conductor 17 is likewise at least more than twice as wide as the narrow strip-like conductor spaced near to parallel to and coplanar with narrow conductor 11 on the opposite side of the narrow strip-like conductor 11 relative to ground conductor 15. Above the substrate 13 is located air. The relative dielectric constant $\epsilon_v$ which is that compared to air ($\epsilon_0$) of the substrate is made, for example, at least on the order of eight.

Referring to FIG. 2, there is illustrated the distribution of the RF electric field 19 of an applied electromagnetic wave to the transmission line of FIG. 1. The RF field is distributed between the center conductive strip 11 and the ground conductors 15 and 17. The RF electric field 19 tangential to the air-dielectric boundary produces a discontinuity in displacement current density at the interface between the dielectric substrate 13 and the air above giving rise to an axial component of RF magnetic field associated with the electric field 19. The axial component of the magnetic field at the interface is in the direction of propagation. The dashed lines 21 in FIGS. 1 and 2 represent the RF magnetic field. The magnetic field 21 extends along both sides of the narrow conductor 11 and passes under the narrow conductor 11. Since the magnetic field of the applied electromagnetic wave has a component in the direction of propagation, the transmission line mode is not in a pure TEM mode but is rather in a quasi-TEM mode. Referring to FIG. 1, it can be seen that as one views the vectorial direction of the RF magnetic field 21 at one spot on either end of the narrow conductor between the narrow strip-like conductor and the wider ground conductor, the RF magnetic field vectors (arrows 18 and 18') at the interfaces appear elliptically polarized in the same sense. If the relative dielectric constant $\epsilon_v$ of the substrate is very large compared to unity, the RF magnetic field vector at the dielectric-air interface between the narrow and lower conductor appears nearly circularly polarized with the same sense of circular polarization on opposite sides of the narrow conductor as indicated by arrows 18 and 18' of FIG. 1. The plane of the circular polarization is in the direction of propagation and is perpendicular to the surface of the substrate 13 as shown in FIG. 1. The transmission line shown in FIGS. 1 and 2 need not be of the two ground conductor configuration, but may have only a single wider ground conductor 15, for example, spaced as shown in FIGS. 1 and 2 on the one side of the substrate 13 and be in the aligned coplanar relationship and have the substrate dielectric constant described above. In the case of the two wider ground planar conductors as shown in FIG. 1, the distance $d$ between the ground conductors 15, 17 should be less than one-half wavelength ($\lambda/2$) at the operating frequency.

When such a transmission line as shown and described above in connection with FIGS. 1 and 2 has a dielectric substrate which is more than twice as thick as the distance between the narrow conductor and the wider ground conductor, it has been found that the characteristic impedance of the surface strip transmission line is determined primarily by the distance between the narrow conductor and the wider or planar ground conductor. FIG. 3 illustrates that the characteristic impedance of the coplanar transmission line can be changed as a function of the $a_1/b_1$ ratio for substrates for various relative dielectric ($\epsilon_v$) constant materials. The distance $a_1$ is the distance from the center point $o$ of the center conductor to the edge $a_1$ of the center conductor and $b_1$ is the distance from the center of the center conductor point $o$ to the nearest edge of the wider or planar ground conductor. It is noted that as the $a_1/b_1$ ratio increases or the relative dielectric constant ($\epsilon_v$) increases, the impedance becomes lower. As the $a_1/b_1$ ratio becomes smaller and/or the relative dielectric constant ($\epsilon_v$) becomes smaller, the impedance increases. With such a structural arrangement the characteristic impedance of the transmission line becomes relatively independent of the substrate thickness. Since the thickness is relatively independent of the characteristic impedance, low loss higher dielectric constant material like that of rutile may be employed which can further reduce the dimensions of such devices. Also the configuration of the coplanar surface strip transmission line configuration permits easy connection of external shunt elements such as active devices as well as the fabrication of series or shunt capacitances.

FIG. 4 illustrates a cross-sectional view of a pair of transmission lines 35 and 36 on a high dielectric substrate 25. A metal capsule 23 which is placed over the dielectric substrate 25 and is connected to the wider ground planar conductors 27, 29 and 31 of the transmission lines 35 and 36 acts both as a protective cover and provides a common ground for the lines. One of the transmission lines 35 is made up of narrow conductor 37 and wider ground conductors 27 and 29 and the other transmission line 36 is made up of narrow conductor 38 and wider ground conductors 31 and 29. Because of the high dielectric constant of the common substrate 25, most of the RF energy is in the dielectric substrate and the loading effect of the metal capsule 23 is negligible if it is located more than twice the width of the spacing between conductors from the surface of the substrate.

Many types of microwave devices may be made using this type of line. FIG. 5 shows a coplanar strip transmission directional coupler wherein the narrow center strip-like conductors 42 and 43 are placed close together for a finite distance between common wider ground plane conductors 46 and 47 on substrate 40. Conductors 45 and 48 serve as wider ground conductors for narrow conductors 42 and 43 at the non-common region. For optimum operating conditions, the coupling section 49, where the narrow conductors are placed close to each other is approximately one-quarter wavelength section or odd multiple thereof at the center operating frequency of the coupler. More than a single quarter wave section may be used to increase the bandwidth of the device. Ports 1 and 2 are the input and output ports respectively and ports 3 and 4 are the coupling and isolation ports. Signals applied to input port 1 are directly coupled to output port 2 with a portion of the signal and coupled across region 49 to output port 4 with no coupling to port 3. Likewise, signals applied at port 2 are transmitted to output port 1 with a portion of the signal coupled across region 49 to port 3 and no coupling to port 4.

It has been found that microwave devices similar in performance to those described by Lax and Button in chapter 12 of "Microwave Ferrites and Ferrimagnetics," McGraw-Hill publication, can be made using the coplanar strip transmission line. As described previously, the RF magnetic field vectors at the dielectric-air interface between the narrow conductor and wider ground planar conductor appear nearly circularly polarized in the same sense on the opposite sides of the narrow conductor. For an electromagnetic wave propagating in one direction 16 through the line, the direction of circular polarization of the vector 18 and 18' is clockwise. For electromagnetic wave propagating in the opposite direction 20, the direction of the circular polarization of the RF magnetic field vectors is opposite or counterclockwise. The plane of the circular polarization is perpendicular to the substrate 13 as shown in FIG. 1. "Gyromagnetic" materials placed at the air-dielectric interface between the narrow conductor and the wider ground planar conductor exhibit when biased by a D.C. magnetic field a difference in permeability which depends both upon the particular field distribution of the RF electromagnetic wave and the strength of the D.C. magnetic field. The term "gyromagnetic" material refers to ferrimagnetic, ferromagnetic and antiferromagnetic materials, which materials exhibit a phenomena associated with the motion of dipoles in these materials in the presence of a D.C. magnetic field and a superimposed RF magnetic field that is similar in many respects to the classical gyroscope. These materials and their properties are discussed by Lax and Button in chapters 1 through 6 in the above cited book entitled "Microwave Ferrites and Ferrimagnetics," McGraw-Hill publication.

By placing the gyromagnetic materials which exhibit a gyromagnetic effect as discussed above in the region of the circular polarization of the magnetic field vector as shown in FIG. 1 and by applying the D.C. magnetic field bias to the materials, various types of reciprocal and non-reciprocal microwave devices are made.

FIG. 6 illustrates a resonant isolator or a differential phase shifter using the above described type of coplanar surface strip transmission line. The device shown in FIG. 6 includes a narrow strip-like conductor 51 and two wider planar ground conductors 52 and 53, like those described previously in connection with FIG. 1, are placed on a dielectric substrate 55 having a dielectric constant $\epsilon_v$ of at least equal to or more than about eight compared to that of air which is located above the substrate. The narrow conductor 51 and wider ground planar conductors (more than twice as wide) 52, 53 are placed in a spaced coplanar parallel and aligned relationship. Pieces of gyromagnetic material 54 and 56 such as ferrite or garnet are placed at the air-dielectric interface and between the narrow conductor 51 and each of the wider ground conductors 52, 53. A positive D.C. magnetic field bias is provided along the coplanar surface perpendicular to the plane of the circular polarization of the magnetic field vectors as shown by arrow 57 in FIG. 6. If the amount or strength of the D.C. magnetic field applied in the direction of arrow 57 is such as to make the natural processional frequency coincide with the frequency of the microwave signal, there is resonance for the positive permeability ($\mu+$) associated with positive circular polarization and none for negative circular polarization. Signals propagated in one direction 58 through the device undergo little or no attenuation since in that direction the permeability is negative ($\mu-$) while signals propagating in the opposite direction 59 in the line undergo an appreciable amount of attenuation since an absorption of power is associated with resonance. An example of a coplanar strip transmission line isolator was constructed on a titanium dioxide ($T_1O_2$) substrate 25 mils thick having a dielectric constant of about 130 with a 30 mil width narrow strip-like center conductor and a 30 mil gap between the narrow strip-like center conductor and the wider ground planar conductors of over 100 mils. The pieces of gyromagnetic material 54 and 56 are 10 mils wide, 5 mils thick, 600 mils long and are G1000 made by Trans-Tech Inc., Gaithersburg, Md. As shown in FIG. 7, the device when biased by a D.C. magnetic field of about 2133 oersteds provides greater than 30 db of attenuation (plot 61 of FIG. 7) when the signals at a frequency of 6 gHz. are propagating in one direction 16 through the line. Also, it is noted that little or no appreciable attenuation takes place to the signals at 6 gHz. propagated in the opposite direction 20 through the line as indicated by plot 62 of FIG. 7.

If the strength of the D.C. magnetic field is such as to bias the gyromagnetic material above or below resonance in the direction of arrow 57 or in the reverse direction, the device provides a differential phase shift between signals propagating in one direction 59 than signals propagating in the reverse direction 58 because of the difference in effective permeability for the waves traveling in the forward and reverse directions.

A reciprocal phase shifter or isolator may be made as shown in FIG. 6 in which the pieces of gyromagnetic material 54, 55 are then biased above or below resonance for a reciprocal phase shifter or at resonance fo- a reciprocal isolator by the application of a D.C. magnetic field in the directions illustrated by the arrows 60.

A field displacement type of isolator may be provided for an arrangement like that shown in FIG. 6 wherein as shown in FIG. 8, above the substrate 63 between the narrow strip-like conductor 64 and wider ground conductors 65 and 66 there is placed pieces 67 and 68 of low dielectric material such as Teflon. Above these low dielectric pieces 67 and 68 is placed a film of resistive material 69 and 70 such as carbon and then above this is placed the pieces of gyromagnetic material 71 and 72. The film of carbon on the inward face of the gyromagnetic material will absorb a lot of energy when the fields are crowded into the gyromagnetic material. The higher permeability for signal propagation in one direction along the length of the narrow conductor 64 causes more of the field energy to be crowded into the gyromagnetic material than signals propagating in the opposite direction along the length of the narrow conductor 64. In this manner no significant energy is absorbed from a wave traveling in the opposite direction and appreciable loss takes place in the reverse or one direction.

Referring now to the partial perspective drawing of FIG. 9 another type of nonreciprocal phase shifter or nonreciprocal isolator is shown. The transmission line is described above in connection with FIG. 1 wherein the narrow strip-like conductor 74 and the wider ground conductors 75 and 76 are fixed to a relatively high dielectric substrate 77 having a given dielectric constant to form the desired transmission line. A slab 78 of the gyromagnetic material such as ferrite is mounted above and in this case across the conductors 74, 75 and 76. A D.C. magnetic field is applied to this device in the direction of arrow 79. In the making of a differential phase shifter or a nonreciprocal resonant isolator, the product of the thickness of the substrate ($t_1$) and the dielectric constant ($\epsilon_1$) of the substrate is substantially more than that of the product of the combined thickness ($t_2$) and dielectric constand ($\epsilon_2$) of gyromagnetic material such as ferrite ($\epsilon_1 t_1 > \epsilon_2 t_2$) so that the circularly polarized RF magnetic field is essentially confined near the surface of the substrate and in the gyromagnetic material. For a given thickness of substrate and ferrite material, the dielectric constant of the substrate material 77 should have a dielectric constant of significantly greater than about twice greater than that of the slab of gyromagnetic material 78. Upon the application of a D.C. magnetic bias in the direction indicated by arrow 79 perpendicular to the direction of propagation and along the surface of the substrate of a strength sufficient to bias the body 78 above or below resonance, the device works as a nonreciprocal phase shifter because of the difference in permeability of the waves traveling in the forward and reverse directions 80, 81. If the thickness $t_1$ and the dielectric constant $\epsilon_1$ of the substrate as shown in FIG. 9 are made substantially equal to that in the ferrite $t_2\epsilon_2$, the device can be made to operate as a reciprocal phase shifter, whereby upon the application of a D.C. magnetic field of a strength to bias the ferrite above or below resonance, signals traveling in one direction through the transmission line undergo an identical amount of phase shift as those signals traveling in the opposite direction through the transmission line. A differential phase shifter like that shown and described in connection with FIG. 9 was constructed having a substrate 20 mils thick and having a relative dielectric constant $\epsilon_1$ at about 130. The slab of gyromagnetic material placed above the conductors was 5 mils thick, 200 mils wide and was 600 mils long. The gyromagnetic slab was a garnet having a relative dielectric constant $\epsilon_v$ of about 15.

FIG. 10 illustrates that more than 40° of (plot 85) differential phase shift takes place for the phase shifter described above operated over a frequency range of 5–7 gHz. and biased with a D.C. magnetic field bias of about 1215 oersteds. A nonreciprocal resonant isolator may be provided by the above described configuration shown in FIG. 9 when biasing the ferrite material in the direction of arrow 79 with a magnetic field such as to bias the body 78 at resonance at the operating frequency.

Referring to FIG. 11, there is shown a top plan view of a resonant bandpass filter 90 using the coplanar surface transmission line configuration described in connection with FIG. 1. FIG. 11 shows a narrow strip-like conductor 91 and wider planar ground conductors 92 and 93 spaced parallel in aligned relationship with each other and located on top of a dielectric substrate 86. The center narrow conductor 91 has a bend along the length thereof. A portion 99 of the narrow center conductor 91 at which bend occurs is connected to a portion of wider ground planar conductor 92. Ground conductor 93 is also extended at the bend as shown in FIG. 11 so as to provide a ground conductor and impedance matching to narrow conductor 91. The center conductor 95 is such that the portions 97 and 98 of the center conductor 91 near the short circuit point 99 are orthogonal to each other at the bend. A sphere 95 of gyromagnetic material such as yittium iron garnet (YIG) is placed near the short circuit point 99 where the narrow conductor meets the ground planar conductor 92 and between portions 97 and 98 of the conductor 91. A D.C. magnetic field is applied in the direction of arrow 94 which is perpendicular to the plane of the substrate 86 and pointing toward the viewer. The D.C. magnetic field bias has a strength such as to bias the YIG material near resonance at the center operating frequency.

Upon the application of signals to the device in the direction of arrows 96 or 96a, little or no coupling exists between the portion 97 of conductor 91 and portion 98 of conductor 91 at signals off the center operating frequency. Only for signals at the resonant frequency does the ferrite sphere 95 couple energy between the two orthogonal portions 97 and 98 of center conductor 91. The center frequency of the passband may be tuned by changing the magnitude of the D.C. magnetic bias. In this manner both the resonant bandpass and band reject filters can be made and they should have little tunable bandwidth limitations because of the broadband characteristics of the surface transmission line. In the case of the band reject filter, the device operates like that of a narrow band resonant isolator. In addition to the devices pointed out in the preceeding paragraphs, it is considered well within the skill in the art to provide simple device configurations like that already in strip transmission lines such as ¼ wave transformers and resonators.

Semiconductor materials may likewise be utilized in association with the subject transmission line as described in connection with FIGS. 1 and 2 so that when biased by an external D.C. magnetic field, devices similar to that described above in conjunction with gyromagnetic materials may be provided. Also, it is well anticipated that semiconductor devices or other current conducting devices may be easily coupled to the coplanar strip transmission line described above in connection with FIGS. 1 and 2 since both the narrow conductor and ground planar conductor are on the same surface. For example, a detector circuit may include as shown in FIG. 12 a diode 101 coupled between ground conductor 102 and narrow conductor 103 all of which is located on the same surface of dielectric substrate 105.

What is claimed is:

1. A transmission line capable of propagation of electromagnetic waves over a range of microwave frequencies comprising:
a dielectric substrate,
at least one thin narrow strip-like conductor adjacent to one surface of said substrate,
at least one ground planar conductor more than twice as wide as said narrow strip-like conductor spaced close to, coplanar with, and running parallel along the length of said narrow strip-like conductor to form with the coplanar narrow strip-like conductor a transmission line, the coplanar spacing between said narrow strip-like conductor and said ground planar conductor and the dielectric constant of said substrate relative to that of the medium adjacent said one surface of said substrate being arranged to in the presence of said electromagnetic waves confine the electric field of said waves primarily between the narrow strip-like conductor and the coplanar ground planar conductor and so that no appreciable radiation exists external to said line.

2. In combination:
a dielectric substrate,
a thin narrow strip-like conductor fixed to one surface of said substrate,
a first ground planar conductor more than twice as wide as said narrow strip-like conductor spaced close to, coplanar with, and running parallel along the length of said narrow strip-like conductor on one coplanar side of said narrow strip-like conductor on said one surface of said substrate,
a second ground planar conductor more than twice as wide as said narrow strip-like conductor spaced close to, coplanar with and running parallel along the length of said narow strip-like conductor on the opposite coplanar side of said narrow strip-like conductor and on the same said one surface of said substrate to form with the narrow strip-like conductor and said first ground planar conductor a transmission line, the spacing between said narrow strip-like conductor and said first and second ground planar conductors and the dielectric constant of said substrate relative to the medium adjacent said surface of said substrate being arranged to in the presence of an applied electromagnetic wave confine the electric field of the wave within said dielectric substrate between the narrow strip-like conductor and said ground planar conductors to minimize radiation and to cause a magnetic component in the direction of propatation to be launched in the presence of the applied electromagnetic wave.

3. The combination as claimed in claim 2 wherein the coplanar distance between the two ground planar conductors is less than half a wavelength at the operating frequency.

4. The combination as claimed in claim 3 wherein said substrate is a flat slab of dielectric material with said conductors fixed to one broad surface of said slab and wherein said substrate has a dielectric constant of at least on the order of eight.

5. The combination as claimed in claim 3 wherein said dielectric substrate has a thickness which is more than twice that of the spacing between said narrow strip-like conductor and one of said ground planar conductors.

6. In combination:
a dielectric substrate,
a thin narrow strip-like conductor fixed to one surface of said substrate,
a first ground planar conductor more than twice as wide as said narrow strip-like conductor spaced close to, coplanar with, and running parallel along the length of said narrow strip-like conductor on one coplanar side of said narrow strip-like conductor on said one surface of said substrate,
a second ground planar conductor more than twice as wide as said narrow strip-like conductor spaced close to, coplanar with, and running parallel along the length of said narrow strip-like conductor on the opposite coplanar side of said narrow strip-like conductor and on the same said one surface of said substrate, said substrate having a dielectric constant compared to the medium adjacent said surface of said substrate so as to in the presence of an applied electromagnetic wave confine the electric field of the wave within said dielectric substrate between the narrow strip-like conductor and said ground planar conductors to minimize radiation and to cause a magnetic field component in the direction of propagation to be launched in the presence of the applied electromagnetic wave thereby establishing a magnetic field between said narrow strip-like conductor and said ground planar conductors having magnetic field vectors which are substantially circularly polarized in the same sense at opposite sides of said narrow conductor as viewed perpendicularly to the direction of propagation of said wave along the surface of said substrate,
at least one body of material which exhibits a gyromagnetic effect upon the application of an external D.C. magnetic field thereto located between said narrow strip-like conductor and one of said ground planar conductors,
means for applying said external D.C. magnetic field to said body of material to interact with said magnetic field.

7. The combination as claimed in claim 6 wherein said dielectric substrate has a dielectric constant of at least on the order of eight.

8. The combination as claimed in claim 7 including a piece of resistive material adjacent to said body.

9. The combination as claimed in claim 7 wherein said body is fixed on said one surface of said dielectric substrate.

10. A directional coupler comprising:

a pair of transmission lines adapted to provide a radio frequency transmission path for electromagnetic waves over a given range of frequencies, each of said lines including a dielectric substrate, a narrow conductor fixed to one surface of said substrate and two wider ground planar conductors more than twice as wide as said narrow conductor spaced close to, coplanar with, and running parallel along the length of said narrow conductor on said one surface of said substrate with one of said wider ground planar conductors being on one coplanar side of said narrow conductor and the other wider ground conductor being on the opposite coplanar side of said narrow conductor, said pair of transmission lines being arranged so that said narrow conductor of each has a given section in close parallel spaced relation to the other so that each narrow conductor lies within the frequency coupling relation of the field of the electromagnetic waves of the transmission path of the other, and wherein said narrow conductors at said given section have a common pair of wider ground planar conductors.

11. The combination as claimed in claim 10 wherein the length of said given section is an odd multiple of one-quarter wavelength at said operating frequency.

12. In combination:

a dielectric substrate, a thin narrow strip-like conductor adjacent to one surface of said substrate, a first ground planar conductor more than twice as wide as said narrow strip-like conductor spaced close to, coplanar with, and running parallel along the length of said narrow strip-like conductor on one coplanar side of said narrow strip-like conductor on said one surface of said substrate, a second ground planar conductor more than twice as wide as said narrow strip-like conductor spaced close to, coplanar with, and running parallel along the length of said narrow strip-like conductor on the opposite coplanar side of said narrow conductor and on the same said one surface of said substrate, said substrate having a dielectric constant compared to the medium adjacent said surface of said substrate so as to in the presence of an applied electromagnetic wave confine the electric field of the wave within said dielectric substrate between the narrow conductor and said ground planar conductors to minimize radiation and to cause a magnetic field component in the direction of propagation to be launched in the presence of the applied electromagnetic wave thereby establishing a magnetic field between said narrow strip-like conductor and said ground planar conductors having magnetic field vectors which are substantially circularly polarized in the same sense at opposite sides of said narrow strip-like conductor as viewed perpendicularly in the direction of propagation of said wave along the surface of said substrate, a slab of a material which exhibits a gyromagnetic effect upon the application of an external D.C. magnectic field thereto located across said narrow strip-like conductor and said ground planar conductors, means for applying said external D.C. magnetic field to said slab to interact with said magnetic field.

13. The combination as claimed in claim 12 wherein slab of material which exhibits a gyromagnetic effect has a product of dielectric constant and thickness less than that of the dielectric constant and thickness of said substrate.

14. The combination as claimed in claim 15 wherein said product of said slab is at least two times less than that of said substrate.

15. In combination:

a dielectric substrate, a thin narrow strip-like conductor fixed to one surface of said substrate, a first ground planar conductor more than twice as wide as said narrow strip-like conductor spaced close to, coplanar with, and running parallel along the length of said narrow strip-like conductor on one coplanar side of said narrow strip-like conductor on said one surface of said substrate, a second ground planar conductor more than twice as wide as said narrow strip-like conductor spaced close to, coplanar with, and running parallel along the length of said narrow strip-like conductor on the opposite coplanar side of said narrow strip-like conductor and on the same said one surface of said substrate, said substrate having a dielectric constant compared to the medium adjacent said surface of said substrate so as to in the presence of an applied electromagnetic wave confine the electric field of the wave within said dielectric substrate between said narrow strip-like conductor and said ground planar conductors to minimize radiation and to cause a magnetic field component in the direction of propagation to be launched in the presence of the applied electromagnetic wave, thereby establishing a magnetic field between said narrow strip-like conductor and said ground planar conductors having magnetic field vectors which are substantially circularly polarized in the same sense at opposite sides of said narrow strip-like conductor as viewed perpendicularly to the direction of propagation of said wave along the surface of said substrate, at least one body of mateiral which exhibits a gyromagnetic effect upon the application of an external D.C. magnetic field thereto located on said substrate between said narrow strip-like conductor and one of said ground planar conductors, and means for biasing said body of material with said external D.C. magnetic field in a direction perpendicular to the plane of said circular polarization and along the surface of said substrate.

16. A microwave isolator operating over a given range of microwave signals comprising:

a dielectric substrate, a thin narrow strip-like conductor fixed to one surface of said substrate, a first ground planar conductor more than twice as wide as said narrow strip-like conductor spaced close to, coplanar with, and running parallel along the length of said narrow strip-like conductor on one coplanar side of said narrow strip-like conductor on said one surface of said substrate, a second ground planar conductor more than twice as wide as said narrow strip-like conductor spaced close to, coplanar with, and running parallel along the length of said narrow strip-like conductor on the opposite coplanar side of said narrow strip-like conductor and said ground planar conductors hav-substrate, said substrate having a dielectric constant compared to the medium adjacent said one surface of said substrate so as to in the presence of an applied electromagnetic wave confine the electric field of the wave within said dielectric substrate between said narrow strip-like conductor and said ground planar conductors to minimize radiation and to cause a magnetic field component in the direction of propagation to be launched in the presence of the applied electromagnetic wave thereby establishing a magnetic field between said narrow strip-like conductor and said ground planar conductors having magnetic field vectors which are substantially circularly polarized in the same sense at opposite sides of said narrow conductor as viewed perpendicularly to the direction of propagation of said component along the surface of said substrate, at least one body of material which exhibits a gyromagnetic resonance upon the application of an external D.C. magnetic field that coincides with the resonance of said microwave signals applied thereto located on said substrate between said narrow strip-like conductor and one of said ground planar conductors, means for applying a sufficient amount of said external D.C. magnetic field to bias said body into resonance with said microwave signals.

17. A resonant bandpass filter capable of propagation of electromagnetic waves over a given range of microwave frequencies comprising:

a flat dielectric substrate, at least one thin narrow strip-like conductor fixed to one surface of said substrate, a first ground planar conductor more than twice as wide as said narrow strip-like conductor spaced close to, coplanar with, and running parallel along the length of said narrow strip-like conductor on one coplanar side of said narrow strip-like conductor on the same said one surface of said substrate, a second ground planar conductor more than twice as wide as said narrow strip-like conductor spaced close to, coplanar with, and running parallel along the length of said narrow strip-like conductor on the opposite coplanar side of said narrow strip-like conductor and on the same said one surface of said substrate, said substrate having a dielectric constant compared to the medium adjacent said one surface of said substrate so as to confine the electric field within said dielectric substrate between said narrow strip-like conductors and said ground planar conductors and to cause a magnetic field to be launched in the direction of propagation and thereby provide magnetic field vectors between said narrow strip-like conductor and said ground planar conductors that appear circularly polarized, said narrow strip-like conductor having a bend therealong forming first and second portions on either end of the bend, said narrow conductor being connected at said bend to said first ground planar conductor, and a body of material exhibiting a gyromagnetic effect upon the application of an external D.C. magnetic field bias placed at the bend between said first and second portions of the narrow strip-like conductor.

18. A transmission line capable of propagation of electromagnetic waves over a range of frequencies comprising:

a dielectric substrate, a thin narrow strip-like conductor fixed to one surface of said substrate, at least one ground planar conductor more than twice as wide as said narrow strip-like conductor being spaced close to, coplanar with, and running parallel along the length of said narrow strip-like conductor, said coplanar distance between said narrow strip-like conductor and said one ground planar conductor being less than one-quarter of a wavelength at the operating frequency, said substrate having a dielectric constant relative to the medium adjacent said one surface of said substrate being arranged in the presence of said electromagnetic waves to confine the electric field of said waves primarily between the narrow strip-like conductor and the coplanar ground planar conductor and so that no appreciable radiation exists external to said line.

References Cited

UNITED STATES PATENTS

| | | | |
|---|---|---|---|
| 2,951,218 | 8/1960 | Arditi | 333—84MX |
| 3,093,805 | 6/1963 | Osifchin et al. | 333—84M |

HERMAN KARL SAALBACH, Primary Examiner

S. CHATMON, JR., Assistant Examiner

U.S. Cl. X.R.

333—10, 73, 84